United States Patent
Zhang (10) Patent No.: US 12,010,583 B2
(45) Date of Patent: Jun. 11, 2024

(54) METHOD, APPARATUS AND SYSTEM FOR MOBILE DEVICE LOCATION DETERMINATION

(71) Applicant: HUAWEI TECHNOLOGIES CO., LTD., Shenzhen (CN)

(72) Inventor: Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 121 days.

(21) Appl. No.: 17/167,906

(22) Filed: Feb. 4, 2021

(65) Prior Publication Data

US 2021/0250731 A1    Aug. 12, 2021

Related U.S. Application Data (60) Provisional application No. 62/971,077, filed on Feb. 6, 2020.

(51) Int. Cl.
    *H04W 4/029* (2018.01)
    *H04W 4/40* (2018.01)

(52) U.S. Cl.
    CPC ............ *H04W 4/029* (2018.02); *H04W 4/40* (2018.02)

(58) Field of Classification Search
    CPC ...... H04W 4/029; H04W 4/40; G01C 21/188; G01C 21/16
    See application file for complete search history.

(56) References Cited

U.S. PATENT DOCUMENTS

| | | | |
|---|---|---|---|
| 9,646,496 | B1 | 5/2017 | Miller |
| 2001/0034239 | A1 | 10/2001 | Yamato et al. |
| 2002/0025824 | A1 | 2/2002 | Lin |
| 2004/0198386 | A1 | 10/2004 | Dupray |
| 2008/0064380 | A1 | 3/2008 | Niemenmaa et al. |
| 2008/0242374 | A1 | 10/2008 | Alexander |

(Continued)

FOREIGN PATENT DOCUMENTS

| | | |
|---|---|---|
| CN | 101239626 A | 8/2008 |
| CN | 102098778 A | 6/2011 |

(Continued)

OTHER PUBLICATIONS

3GPP TS 38.305, V15.4.0, 3rd Generation Partnership Project; Technical Specification Group Radio Access Network; NG Radio Access Network (NG-RAN); Stage 2 functional specification of User Equipment (UE) positioning in NG-RAN (Release 15), Jun. 2019, 72 pages.

(Continued)

*Primary Examiner* — Marcus Hammonds (57) ABSTRACT

Method, system and device for obtaining location information of a mobile device coupled to a wireless network. A request for a location of the device at a first set of times is transmitted by the mobile device toward a first function. A location of the device at the set of times is determined. In response to receipt of the request, the first function replies with an indication of location of the device at the specified times. The mobile device then performs a local tracking operation to determine a location of the device at another time. The local tracking operation is based on the location of the device at the specified times and local input indicative of motion of the device between at least one of the set of times and the other time.

15 Claims, 5 Drawing Sheets

(56) References Cited

U.S. PATENT DOCUMENTS

| | | |
|---|---|---|
| 2008/0261612 A1 | 10/2008 | Mia et al. |
| 2011/0060807 A1 | 3/2011 | Martin et al. |
| 2012/0154286 A1 | 6/2012 | Lim et al. |
| 2012/0315903 A1 | 12/2012 | Yoshimura et al. |
| 2015/0226577 A1* | 8/2015 | Le Grand ............. G01C 25/00 702/94 |
| 2015/0312721 A1* | 10/2015 | Singh .................. H04W 4/33 455/456.1 |
| 2016/0307442 A1 | 10/2016 | Relyea et al. |
| 2017/0371337 A1 | 12/2017 | Ramasamy |
| 2018/0089994 A1 | 3/2018 | Dhondse et al. |
| 2018/0247138 A1 | 8/2018 | Kang |
| 2018/0262903 A1 | 9/2018 | Ryan et al. |
| 2019/0035280 A1 | 1/2019 | Kim et al. |
| 2019/0078897 A1 | 3/2019 | Sumizawa |
| 2019/0384293 A1 | 12/2019 | Yoo |
| 2020/0068481 A1 | 2/2020 | Kim et al. |
| 2020/0410260 A1 | 12/2020 | Choe |
| 2021/0018916 A1 | 1/2021 | Thakur |
| 2021/0160810 A1 | 5/2021 | Zhang et al. |
| 2021/0407290 A1 | 12/2021 | Oba |

FOREIGN PATENT DOCUMENTS

| | | |
|---|---|---|
| CN | 104244404 A | 12/2014 |
| CN | 104796865 A | 7/2015 |
| CN | 106646573 A | 5/2017 |
| CN | 107121980 A | 9/2017 |
| CN | 107222894 A | 9/2017 |
| CN | 109451580 A | 3/2019 |
| CN | 109813332 A | 5/2019 |
| CN | 109842934 A | 6/2019 |
| EP | 3190426 A1 | 7/2017 |
| EP | 3240311 A1 | 11/2017 |
| EP | 3352486 A1 | 7/2018 |
| JP | 2002518684 A | 6/2002 |
| JP | 2018197964 A | 12/2018 |
| KR | 20050017046 A | 2/2005 |
| WO | 2012099828 A1 | 7/2012 |
| WO | 2019027245 A1 | 2/2019 |

OTHER PUBLICATIONS

3GPP TS 23.273 V16.1.0, 3rd Generation Partnership Project; Technical Specification Group Services and System Aspects; 5G System (5GS) Location Services (LCS); Stage 2(Release 16), Sep. 2019, 90 pages.

N4: "Clarifications on GSM vs. UMTS specific parts", 3GPP Draft; 23007-005, 3rd Generation Partnershipproject (3GPP), Mobile Competence Centre;650, Route Des Lucioles;F-06921 Sophia-Antipolis Cedex France,vol. TSG CN, No. Dusseldorf, Germany; Jul. 19, 2000, Jul. 19, 2000(Jul. 19, 2000), XP050047730, total:7pages.

R3: "Correction to LMU Information Signaling", 3GPP Draft; R3 122308, 3rd Generation Partnership Project (3GPP), Mobile Competence Centre;650, Route Des Lucioles;F-06921 Sophia-Antipolis Cedex France vol. RAN WG3 Sep. 29, 2012 (Sep. 29, 2012), XP050670136, total:6pages.

* cited by examiner

METHOD, APPARATUS AND SYSTEM FOR MOBILE DEVICE LOCATION DETERMINATION

CROSS-REFERENCE TO RELATED APPLICATIONS

This application claims priority to U.S. provisional patent application Ser. No. 62/971,077 filed Feb. 6, 2020, the contents of which are incorporated herein by reference.

FIELD OF THE INVENTION

The present invention pertains to positioning and communication, and in particular to a method and apparatus for estimating a location.

BACKGROUND

Techniques for location based services are important for supporting current and future mobile device applications. Indeed, many location based wireless control and management services, such as location based user equipment (UE) operation optimization and location based resource management in vehicle-to-everything (V2X) systems, have been proposed. Techniques used for such location based services need control/management maps and also require location information being available at wireless network entities (e.g. devices, cell phones, access points).

Many network entities acquire location information through a global positioning system (GPS) or similar system. GPS systems use satellites to enable a GPS receiver to determine the location of the network entities. The location information is two-dimensional information indicative of absolute geographic location of the device, including latitude and longitude of the device. Unfortunately, there are several issues for GPS system. One of the issues is unavailability of GPS signal especially indoors or on streets in urban areas. Another issue is extensive power consumed in computing the location of the device. Moreover, the GPS system cannot distinguish devices situated on different floors of the same building due to lack of altitude information, because typically only two-dimensional position information is determined.

There are systems using alternative positioning techniques such as 3rd Generation Partnership Project (3GPP) positioning techniques and Wi-Fi based techniques. However, these techniques are more suitable for networks or access points, rather than devices themselves, when obtaining device location. In addition, while there are some systems enabling mobile devices to locally estimate their locations, accuracy for the locations estimated is far from the desired level (e.g. accuracy is only cell or access point level of accuracy).

Therefore, there is a need for a method, apparatus and system for determining a location of a mobile device that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method, apparatus and system for mobile device location determination. This may involve providing a mobile device with information indicating the mobile device's geographic location, thus allowing the mobile device to determine its location. The mobile device is communicatively coupled to a separate function or device, typically in a wireless communication network, also referred to as a wireless network. The function or device is capable of obtaining an indication of the location of the mobile device, which is determined through previously known procedures for example operating on wireless signals transmitted by the mobile device. The mobile device receives this indication of location from the function or device via wireless communication, and updates its own local (e.g. dead reckoning) position tracking operations to incorporate this information. This may involve updating parameters of the local tracking operations, or restarting the local tracking operations using new starting conditions, or both. A technical effect may be that the wireless network infrastructure assists the mobile device's location determination, thus potentially improving operation. Another technical effect may be that the mobile device performs its own local location determination operations with reduced network involvement, thus reducing dependency on wireless signalling for location determination.

In accordance with a first embodiment of the present invention, there is provided a method for obtaining location information of a mobile device operatively coupled to a wireless network. The method comprises transmitting, by the mobile device toward a first function operating in the wireless network, a request for a location of the mobile device at a first set of times. The method further comprises determining, by the first function, a location of the mobile device at each of the first set of times. These times may be times in the past for which the mobile device has access to a locally generated record of motion of the mobile device. The method further comprises, in response to receipt of the request by the first function, transmitting, to the mobile device, a reply indicating the location of the mobile device at each of the first set of times. The method further comprises, in response to receipt of the reply by the mobile device, updating a local tracking operation performed by the mobile device to reflect the location of the mobile device at each of the first set of times as indicated in the reply. The method further comprises performing, by the mobile device, the local tracking operation to determine a location of the mobile device at a second time, for example a current time at which the location is of interest for a given application. The local tracking operation is based at least in part on the location of the mobile device at each of the first set of times and local input indicative of motion of the mobile device between at least one of the first set of times and the second time. A technical effect may be that the network provides location information to the mobile device in order to improve accuracy, while also limiting the amount of location information that is required by the mobile device in order to reduce signalling.

In accordance with embodiments disclosed herein, mobile devices may be able to determine their location independently of other technologies such as global positioning system (GPS), by simply using network functions present in networks that the mobile devices may already be connected to. This is advantageous over the prior art, as embodiments disclosed herein may be used to determine locations of mobile devices where GPS or similar other technologies cannot function.

In accordance with another embodiment of the present invention, there is provided a method for facilitating location determination of a mobile device operatively coupled to a wireless network. The method comprises transmitting, by the mobile device toward a first function operating in the wireless network, a request message indicating a plurality of times for which location information is required. The method further comprises transmitting, by the first function toward the mobile device, a response to the request message. The response indicates a plurality of locations of the mobile device at the plurality of times or at another plurality of times specified in the response. The plurality of locations are determined by components of the wireless network tracking location of the mobile device. A technical effect may be that the network can provide location information at multiple points in response to a single request, thus improving efficiency while also allowing mobile device route tracking.

In accordance with another related embodiment of the present invention, there is provided a method for location determination. The method includes transmitting, by a mobile device toward a first function, a request for a location of the mobile device at a first set of times. The method includes receiving, by the mobile device, a reply indicating a location of the mobile device at each of the first set of times. The method includes performing, by the mobile device, a local tracking operation to determine a location of the mobile device at a second time. The local tracking operation is based at least in part on the location of the mobile device at each of the first set of times and local input indicative of motion of the mobile device between at least one of the first set of times and the second time. Technical effects in such embodiments can be as already described above.

In some embodiments, the location of the mobile device at the each of the first set of times is determined, by the first function or another function remote from the mobile device, based on processing of signals transmitted by the mobile device at the at least one of the first set of times. In some embodiments, the request is transmitted by the mobile device based on one or more of: a predetermined time schedule; a determination that the mobile device has travelled at least a predetermined distance from the locations of the mobile device at each of the first set of times; and a determination that an estimate of location locally generated by the mobile device includes a predetermined threshold amount of error.

In some embodiments, the local tracking operation comprises: recording mechanical parameters of a vehicle incorporating the mobile device at times following the first set of times, the mechanical parameters indicative of speed and direction of the vehicle between the first set of times and the second time; and estimating, based on the recorded mechanical parameters together with the location of the mobile device at each of the first set of times as indicated in the reply, the location of the mobile device at the second time. In some embodiments, the first set of times includes a single time or multiple times.

In some embodiments, the method further includes, prior to transmitting the request for the location of the mobile device: transmitting a tracking request toward the first function, the tracking request causing the first function to track the location of the mobile device at a plurality of times including the first set of times. In some embodiments, the local tracking operation is performed at the second time.

In some embodiments, the method includes repeatedly performing, by the mobile device, the local tracking operation at each of a plurality of second times, including the second time, to determine the location of the mobile device at each of said plurality of second times, the local tracking operation based at least in part on the location of the mobile device at each of the first set of times and local input indicative of motion of the mobile device between at least one of the first set of times and a respective one of the plurality of second times.

In accordance with another embodiment there is provided a system comprising a mobile device operatively coupled to a wireless network and a first function operating in the wireless network. The mobile device is configured to transmit a request for a location of the mobile device at a first set of times. The first function is configured to determine a location of the mobile device at each of the first set of times. The first function is further configured to subsequently receive the request. The first function is further configured, in response to the request, to transmit, toward the mobile device, a reply indicating the location of the mobile device at each of the first set of times. The mobile device is further configured, in response to receipt of the reply by the mobile device, to update parameters or starting conditions of a local tracking operation to reflect the location of the mobile device at each of the first set of times as indicated in the reply. The mobile device is further configured to perform the local tracking operation to determine a location of the mobile device at a second time. The local tracking operation is based at least in part on the location of the mobile device at each of the first set of times and local input indicative of motion of the mobile device between at least one of the first set of times and the second time. Potential technical effects are the same as stated above.

In accordance with another embodiment there is provided a mobile device operatively coupled to a wireless network. The mobile device is configured to transmit, toward a first function operating in the wireless network, a request for a location of the mobile device at a first set of times. The mobile device is further configured to receive, from the first function operating in the wireless network, a reply indicating the location of the mobile device at each of the first set of times. The mobile device may further be configured, in response to receipt of the reply, to update parameters or starting conditions of a local tracking operation to reflect the location of the mobile device at each of the first set of times as indicated in the reply. The mobile device is further configured to perform the local tracking operation to determine a location of the mobile device at a second time. The local tracking operation is based at least in part on the location of the mobile device at each of the first set of times and local input indicative of motion of the mobile device between at least one of the first set of times and the second time. Potential technical effects are the same as stated above with respect to the corresponding method. Another technical effect may be that the mobile device can improve its local tracking operations in response to corrective feedback from the network. The mobile device may be further configured in accordance with the above-described method for location determination.

In accordance with another embodiment there is provided a function operating in the wireless network. The function is configured to determine a location of the mobile device at each of a first set of times. The function is further configured to subsequently receive, from a mobile device operatively coupled to the wireless network, a request for a location of the mobile device at a first set of times. The function is further configured, in response to the request, to transmit, toward the mobile device, a reply indicating the location of the mobile device at each of the first set of times. In some embodiments the request for the location of the mobile device is received subsequently to determining the location of the mobile device.

In accordance with another embodiment, there is provided a method for facilitating location determination of a mobile device operatively coupled to a wireless network. The method includes receiving, by a first function operating in the wireless network, from the mobile device, a request message indicating a first set of times for which location information is required. The method further includes transmitting, by the first function toward the mobile device, a response to the request message. The response indicates a plurality of locations of the mobile device at the first set of times or at another first set of times specified in the response. The plurality of locations are determined by components of the wireless network tracking location of the mobile device.

In some embodiments, the plurality of locations of the mobile device are determined, by the first function or another function remote from the mobile device, based on processing of signals transmitted by the mobile device at the first set of times or at the other first set of times.

In some embodiments, the above method further includes tracking, by the first function, the location of the mobile device at the first set of times in response to a request to begin tracking of the mobile device at a plurality of times including the first set of times.

In some embodiments, the above method further includes, by the components of the wireless network: determining and transmitting, from the components of the wireless network to the first function, the plurality of locations of the mobile device; receiving, from the mobile device, a request for the location of the mobile device at a first set of times; and in response to the request, transmitting, toward the mobile device, a reply indicating the location of the mobile device at each of the first set of times, based on the plurality of locations of the mobile device as transmitted from the components of the wireless network.

In some embodiments, the above method further includes transmitting, by the mobile device toward the first function, the request message for the location of the mobile device at the first set of times; receiving, by the mobile device, the response; and performing, by the mobile device, a local tracking operation to determine the location of the mobile device at a second time, the local tracking operation based at least in part on the location of the mobile device at each of the first set of times and local input indicative of motion of the mobile device between at least one of the first set of times and the second time.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention provide for a method and apparatus for providing a mobile device with information indicating the mobile device's location. The mobile device is communicatively coupled to a wireless communication network, also referred to as a wireless network. A function or device in the wireless network is capable of obtaining an indication of the location of the mobile device, which may be determined by one or more devices through known procedures operating on wireless signals transmitted by the mobile device. For example, the 3GPP Technical Specification Document numbered 3GPP TS 38.305, v15.4.0, June 2019, relates to UE positioning in next-generation (NG) radio access network.

Positioning may be performed by the network by measuring radio signals. In some cases, at least one networked device may receive and identify a radio signal transmitted by the mobile device, and thus determine that the mobile device is in a predetermined area near to the networked device. By processing other aspects such as the signal strength, direction of arrival, or signal flight time (based for example on time stamp information), or a combination thereof, the location of the mobile device can further be determined. In some cases, multiple networked devices may cooperate to determine the mobile device's location through techniques such as triangulation or multilateration, for example involving time difference of arrival processing applied to a signal transmitted by the mobile device and received at each of the multiple networked devices. A single function or device may process the radio signals to determine the device's location, or a plurality of functions or devices may cooperatively process the radio signals to determine the device's location. Accordingly, the location of the mobile device may be determined based on processing of signals transmitted by the mobile device. This determination may be performed by a function remote from the mobile device, such as the function (referred to as the first function) to which the mobile device transmits its request for location.

Although elements in the wireless network are capable of determining the location of the mobile device, the mobile device itself does not automatically have access to this location information. Embodiments of the present invention provide the mobile device with access to its own location information.

In various embodiments, to provide for efficient and effective operation, location information is transmitted to the mobile device in response to receipt of a location information request transmitted by the mobile device. The mobile device can request, in a single request message, information regarding its location at one time, or more typically at a plurality of different but relatively close times. The location information can indicate the mobile device's physical location with relative precision, for example within 1 meter, or within 30 centimeters, or within 10 centimeters, depending on requirements, the capabilities of the network, or both. The indications of physical locations in the location information are referred to as reference locations.

In various embodiments, because location information is obtained from the network, unavailability of GPS signals in certain environments is not a concern. Also, because GPS is not used, the network-based positioning system may be capable of being configured to determine mobile device altitude, for example by using suitable network components to actively sense the mobile device location based on signals emitted thereby. Because the location itself is computed within the network, the mobile device does not necessarily need to compute its location and thus power consumption by the mobile device for this purpose may be mitigated. Also because the location is computed by the network, more accurate location measurements may be enabled. This is because more powerful techniques may be possible using network components.

Furthermore, to mitigate the requirement for location information messaging to and from the mobile device, the mobile device can be configured to track its own location for certain periods of time using dead reckoning in a local tracking operation. That is, the mobile device can request and receive location fixes at one or more times and thereafter update its current location based on locally obtained information such as velocity, time and acceleration information. This locally obtained information can be generated using local measurement devices such as accelerometers, or using other available information such as steering and velocity data provided by a vehicle holding the mobile device. This approach allows for conservation of communication resources while also providing adequately timely and accurate location data at the mobile device.

Because dead reckoning is subject to cumulative error, the mobile device can occasionally or periodically request location information from the network in order to re-initialize or correct the dead reckoning process. The mobile device can request location information after a predetermined period of time, or after moving a predetermined distance from a reference location, or after another condition such as an accumulated amount of location estimation error, for example.

In various embodiments, the mobile device may request and obtain location information from the communication network at multiple times. This information may be used to improve operation of the dead reckoning process. For example, the mobile device may determine its location based on information regarding its location at one or more times. The mobile device may estimate its velocity based on information regarding its location at two or more different times, for example by determining the distance between two points corresponding to two of the times and dividing this by the difference between the two times. The mobile device may estimate its acceleration based on information regarding its location at three or more different times, for example by estimating the velocity at a first two points, estimating the velocity at a second two points, and estimating the acceleration as the rate of change between the two estimated velocities. Use of multiple data points may improve location accuracy, but at the cost of additional messaging overhead.

To enable location based techniques to be applied in a variety of services, for example, smart city services (e.g. an urban area using a variety of Internet of Things sensors), Industry 4.0 services (factories having machines augmented with wireless connectivity and sensors), self-driving vehicle applications, and so on, an efficient, reliable and a ubiquitous positioning system is considered herein. The system facilitates mobile devices in determining their location information with certain accuracy. The determination is made using a combination of information from the network and information locally generated and available to the mobile device.

In embodiments of the present invention, an access network assistant mechanism is provided by which mobile devices can obtain their location. The term mobile device refers to a device having wireless communication capability that may or may not be moved, but which is sufficiently location-agnostic that it is necessary to determine or verify the device's location at least occasionally or periodically. A particular use case considered herein is mobile devices integrated into or provided in the form of a vehicle, which may be self-driving or which may comprise an integrated, networked navigation assistance device. Some new control and management messages are proposed and some flow charts are also described as examples.

3rd Generation Partnership Project (3GPP) positioning techniques provide an efficient approach enabling a network to accurately estimate location of devices. Embodiments of the present invention utilize this technique to assist location determination by devices. Embodiments of the present invention perform periodic acquisition of location information from a network, along with local location estimation by a mobile device at times between successive acquisitions of location information from the network. The location information acquired from the network can be used to correct the device's local location estimates.

Figure 1:
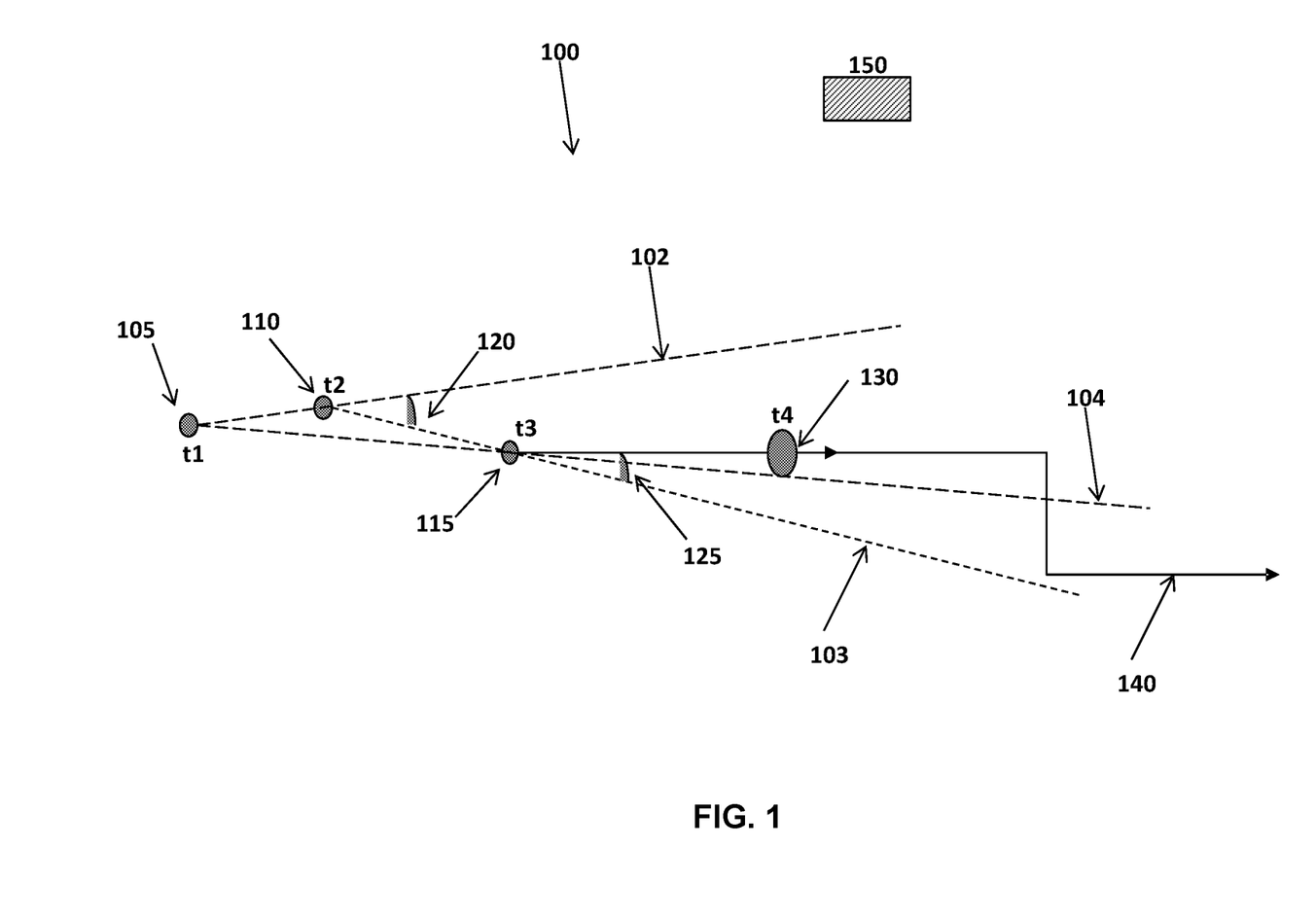
FIG. 1 illustrates an operation by which location may be estimated locally by a mobile device, according to embodiments of the present invention.

Referring now to FIG. 1, by way of example, in operation 100, a first reference location 105 corresponding to location of the mobile device at a first time t1, a second reference location 110 corresponding to location of the mobile device at a second time t2, and a third reference location 115 corresponding to location of the mobile device at a third time t3 are depicted. Additionally, angle 120 and angle 125 are depicted. More specifically, the angle 120 is formed between a line 102 running through both reference location 105 and reference location 110, and a line 103 running through reference location 110 and reference location 115. The angle 125 is formed between a line 104 running through both reference location 105 and reference location 115, and a line 103 running through reference location 110 and reference location 115. The lines intersecting two reference points are depicted as the dashed lines 102, 103, 104 in FIG. 1. Estimated location 130 corresponding to location of the mobile device at a fourth time t4 can be calculated as a function of angle 120, angle 125, the times t1, t2, t3 and t4 and the reference location coordinates at those times, and the speed measured using reference location 105, reference location 110 and reference location 115. Various dead reckoning models can be used to estimate the location 130 based on available information including the reference locations and locally generated velocity and direction information. An estimated path and direction of the mobile device is shown as path 140. A device or function 150 providing (via wireless communication) the mobile device with indications of the reference locations 105, 110, 115 is also shown.

Figure 2:
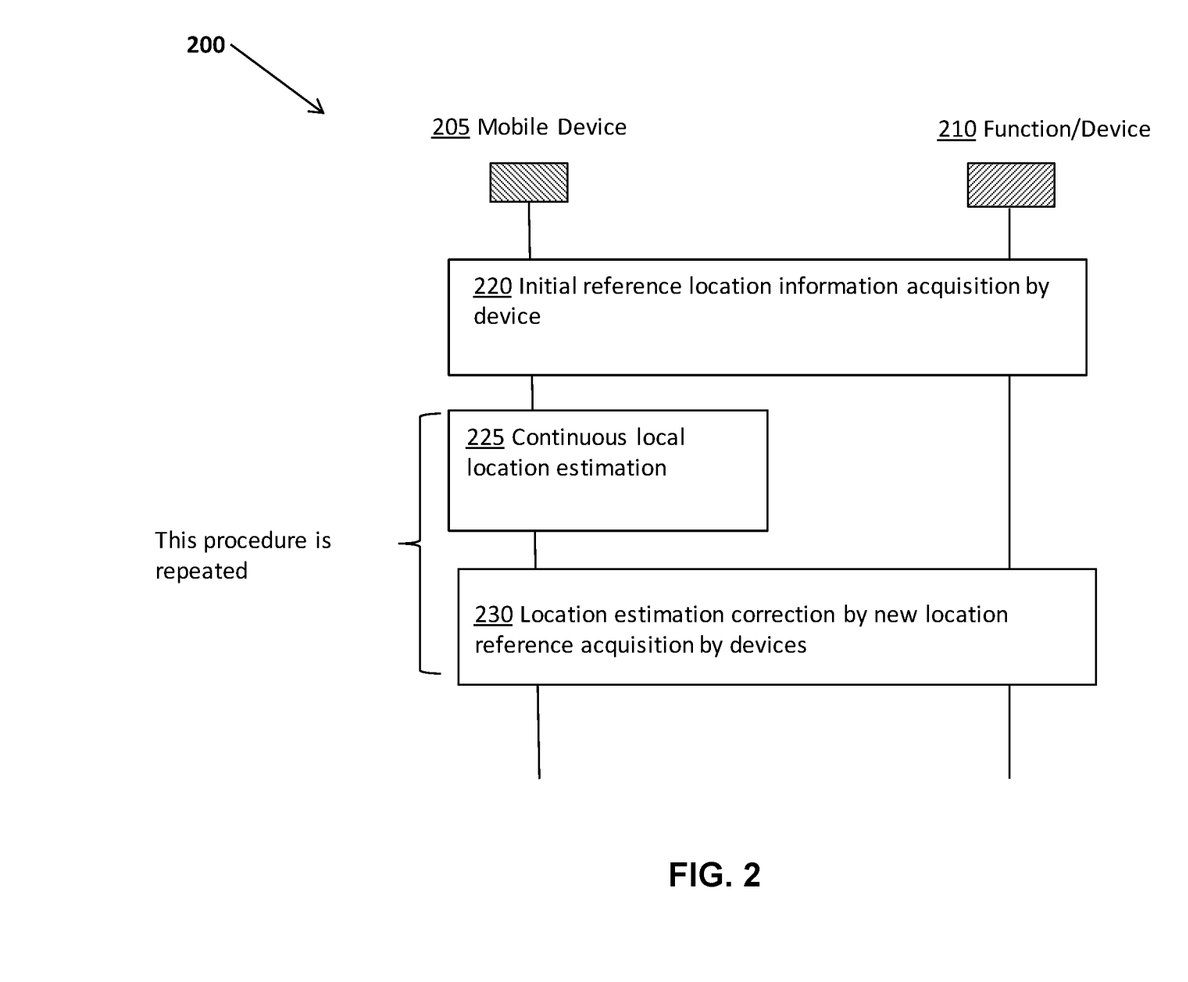
FIG. 2 illustrates operations performed by a mobile device and access network, according to an embodiment of the present invention.

Referring now to FIG. 2, operations performed by a mobile device and access network are illustrated, according to an embodiment of the present invention. A system 200 provided according to the embodiment contains a device 205 and a location providing function or device 210. The mobile device 205 may be an electronic device such as a computer, mobile phone, or the like, or it may be a larger device such as a vehicle, or a navigation system integrated with or operatively coupled to and carried within a vehicle or other mobile platform. The request may include an identifier of the mobile device. The first function or device 210 may be a network access function or network processing function. The first function or device may reside in the core portion of the wireless network, edge (radio access) portion of the wireless network, or a combination thereof. The first function or device 210 may be provided within (e.g. as part of) a wireless network, and may be communicatively coupled to the device 205 via the wireless network. For example, the first function or device may be a network function or device which is instantiated in a datacenter using one or more servers, or on a dedicated networked computing device. The first function or device may receive indications of location from other devices which are part of or operatively coupled to an access network. For example, one or more monitoring functions or devices at wireless access nodes may monitor for signals transmitted by the device 205 and process the signals (or forward indications of the signals for processing) to determine the location of the device. The signals transmitted by the mobile device at a given time can be processed to determine the location of the mobile device at that time. In some embodiments, the signals transmitted by the mobile device at one given time can be processed to determine the location of the mobile device at one or more different times. For example, the signals can be processed to determine a first location and forward or backward model-based prediction can be used to determine the mobile device's location at the one or more different times.

At step 220, the device 205 acquires initial location information from the function or device 210 by requesting the function or device 210 for location information of the device 205. For example, the device may send a "Location Information Request" message to request the location information. The request may be received by one or more radio access nodes of the access network. Once received, the request is forwarded to the function or device 210 for processing and response. The request may include a request for location information indicating the physical location of the device 205 at one or more specified times. For example, referring to FIG. 1, the mobile device may request location information indicating physical location of the device at times t1, t2 and t3, which will result in indications of the locations 105, 110 and 115.

According to one embodiment, a "Location Information Request" message, sent by devices, includes various information, for example as follows. The information includes as an identifier of the mobile device (or of a subscriber related to the mobile device). The information includes the number of reference locations for which location information is being requested, (the number of locations being referred to herein as value "N"). The information includes a list of N time values in seconds. For example, Time 1 may be the time at which the mobile device was at location 1, Time 2 may be the time at which the mobile device was at location 2, etc. The N time values may be the times (e.g. t1, t2, t3) for which location information is being requested.

The function or device 210, having been tracking the device's location (e.g. by processing measurements of radio signals as mentioned above, possibly in cooperation with other functions or devices), and in receipt of the location information request message, then generates and sends a "Location Information Response" message to the device 205, including the requested location information. The response is sent via the communication network. The initial location information refers to location information acquired before local location estimation begins, or begins again after a substantial time of inactivity. At step 225 the device 205 begins a local tracking operation. The local tracking operation includes tracking, using locally available information (dead reckoning), the device's own location, based in part on the indications of physical location as received from the network. The local tracking based on locally available information is not necessarily perfect, but is typically subject to cumulative error and may be regarded as an estimate only. An example of the local tracking operation (yielding the estimated location 130) is illustrated in FIG. 1. This local tracking operation continues without further network input until determination is made that further location information is required from the network. For example, the determination that further location information is required may be triggered by the local tracking operation having been performed for a predetermined amount of time, or the device having travelled a predetermined distance, or the cumulative error having been determined to have potentially reached a predetermined threshold.

According to one embodiment, the "Location Information Response" message includes various information, for example as follows. The information includes the subscriber or mobile device ID. The information includes the number of reference locations (N) being indicated in the response. The information may include, for each reference location, the location value and the time value in seconds (e.g. t1, t2, t3) indicating the time at which the location was measured.

Then, at step 230, the device 205 and the function or device 210 cooperate to correct the location estimation performed in step 225. Specifically, the device 205 sends another "Location Information Request" message to the function or device 210 and the function or device 210 sends a corresponding "Location Information Response" message to the device 205. This provides the device 205 with new location reference information, indicative of location of the device at one or more specified times. For example, the locations 105, 110, 115 at times t1, t2 and t3 as indicated in FIG. 1 can be requested and provided in this manner. Step 230 can include similar operations to step 220. The location estimation correction is performed after local location estimation has begun, and is used in adjusting the local location estimation.

Steps 225 and 230 are repeated in order to continuously estimate the location of the device 205. The repetition may continue while the device 205 is in communication with the function or device 210, or until the device 205 determines that the location tracking is no longer required, or another termination condition is reached. The device 205 may be a moving device, such as a vehicle. Where the device is a vehicle, the vehicle performs a local tracking operation to determine its location. The local tracking operation may be performed based on the reference locations, driving mechanical parameters (for example, the distances to these reference locations and speed and steering parameters, also referred to as local input), or the like, or a combination thereof. Example reference locations are locations 105, 110, 115 in FIG. 1. Steering parameters may be signals provided from the vehicle's driving system indicating a set of directions which the vehicle is steered in at a corresponding set of times. Speed parameters may indicate the speed of the vehicle. The driving mechanical parameters can thus be used to generate an indication of relative change in physical location of the vehicle over time. As mentioned above, because the local tracking operation is performed, the need to communicate with the network to obtain location information is mitigated, thus improving communication efficiency.

In more detail, the local tracking operation may include recording mechanical parameters of a vehicle incorporating the mobile device at a set of times. Based on this, and based on the reference locations, the location of the mobile device at a second time is estimated. The tracking operation may be performed at the second time or following the second time. Estimating the location of the mobile device at the second time is therefore based on the recorded mechanical parameters together with the location of the mobile device as indicated by the function or device 210. The mechanical parameters are an example of local input which is provided to the mobile device and used in a dead reckoning procedure to determine subsequent location of the mobile device.

The device 205 then periodically obtains its location information from the function or device 210 to update parameters or starting conditions of its local tracking operation. In other words, because the dead reckoning location information estimation based on mechanical parameters is subject to cumulative error, periodically the device can request and receive location information from the function or device 205. As mentioned above, the function or device 205, possibly in cooperation with further functions or devices, tracks the device based on radio signals (e.g. using triangulation or trilateration techniques). This location information is used to update parameters or starting conditions of (e.g. correct or re-initialize) the device's own local tracking operation. The update may be triggered by time (period), the distance from reference locations, or by the presence of some mechanical parameter error. The parameter updating can improve accuracy of the local tracking (dead reckoning) operation over time. This results in more accurate location information available to the mobile device, and possibly a lower requirement for requesting location information from the first function or device 210.

Additionally, in some embodiments, the device can process the location information received from the network together with the location information provided by the device in order to improve its local location estimation procedure. For example, the location information received from the network can include a first indication of location at a given time t. A second indication of location at the given time t can then be estimated locally by the device using dead reckoning. The difference between the first and second indications of location can be computed to determine an estimation error.

The dead reckoning can be performed based on a parameterized dead reckoning model. The parameters of the dead reckoning model can be adjusted in order to reduce the error, and the dead reckoning model, with the adjusted parameters, can then be used for further dead reckoning location estimation. For example, if there is an inaccuracy in the dead reckoning procedure due to an error introduced by sensors providing steering or speed information, a correction parameter in the dead reckoning position processing model can be adjusted to counter this error.

Figure 3:
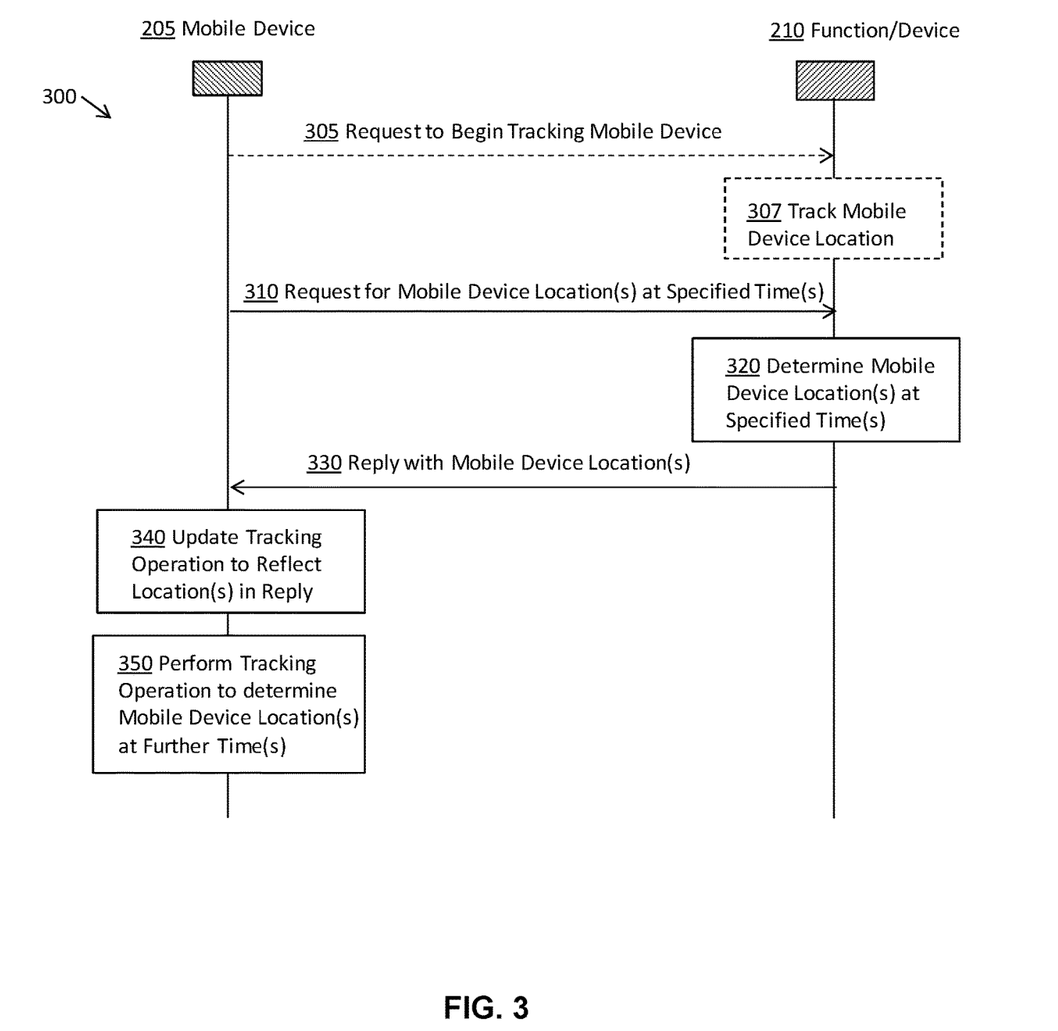
FIG. 3 depicts a method for determining a mobile device's location, according to an embodiment of the present invention.

Referring now to FIG. 3, a method 300 for determining a location of a device 205 operatively coupled to a wireless network is presented where the device 205 is a mobile device for example as in the description below.

The method 300 includes, at step 310, transmitting, by the mobile device toward a first function operating in the wireless network, a request for a location of the mobile device at a first set of times. The first set of times may include a single time. The first set of times may include a plurality times. By using a plurality of times, the location of the mobile device, its speed, direction, acceleration, etc. may be more accurately determined, as already described above. Furthermore, the first set of times can be communicated in the same message, thus mitigating communication overhead.

The request may be transmitted by the mobile device based on a predetermined time schedule. The request may be transmitted by the mobile device based on a determination that the mobile device has travelled at least a predetermined distance from the last location that was transmitted to the mobile device in response to a prior, similar request. The request may be transmitted by the mobile device based on a determination that an estimate of location locally generated by the mobile device includes a predetermined threshold amount of error. That is, when the mobile device is no longer to guarantee accuracy of its locally estimated location within predetermined error bounds, it may request a new indication of location. The request may be transmitted based on a combination of the above factors. For example, the request may be transmitted when a numerical indicator exceeds a predetermined threshold. The numerical indicator may be a weighted combination of two or more of: time elapsed since the last request, distance travelled since the last request, and error in local location estimate. By transmitting the request on the basis of one or more of the above conditions, the mobile device can maintain accurate location information even while using a dead reckoning procedure. This is caused by refreshing the location information periodically or on an as-needed basis with accurate location information from the network, in order to counteract the tendency of dead reckoning procedures to accumulate error and provide a location estimate which drifts away from the true location without bound.

In order to accommodate the request, the first function may be required to have previously registered that the mobile device is to be tracked. In some embodiments, the first function may automatically track all mobile devices which are recognized by the network. In other embodiments, the first function may initiate tracking particularly (and possibly only) for mobile devices which register for this service to be provided. This improves efficiency by only tracking mobile devices which are expected to use the location information. Accordingly, and in some embodiments, the method 300 includes transmitting 305, by the mobile device 205 toward a first function 210 operating in the wireless network, a request to begin tracking the mobile device. The request may be part of a registration procedure, for example, and may include an identifier of the mobile device. The request may be transmitted prior to transmitting a request for the location of the mobile device 205. The request may further include tracking parameters such as frequency, priority, precision or accuracy parameters. For example, the tracking parameters may indicate a schedule of how frequently the mobile device location should be tracked by components in the wireless network. The tracking parameters may indicate what priority should be assigned to tracking the mobile device, which may influence the amount of resources dedicated to tracking. The tracking parameters may indicate the amount of precision or accuracy of the location determinations. This may influence the type of location tracking technologies used and the amount of resources dedicated to tracking. The request to begin tracking the mobile device initiates the tracking before the mobile device requires location information, thus ensuring that location information will be available when needed. The request also allows the components of the network (e.g. the first function) to selectively track mobile devices, so that not all mobile devices need to be tracked. This conserves network resources.

In response to the request, the first function or device 210 initiates tracking 307 of the mobile device's location over time. The tracking may be performed using components of the wireless network, and the function or device may transmit instructions to these components to initiate the tracking according to the tracking parameters. The components may include, for example, radio access nodes, in cooperation with a tracking function instantiated in the network. The radio access nodes can receive and signals from the mobile device. These signals may be control or data signals transmitted by the mobile device during its normal course of operation, or dedicated signals used specifically for tracking purposes. The radio access nodes, tracking function, or both, can then determine the mobile device's location based on properties of the signals, for example via triangulation or multilateration techniques. As such, the mobile device's location is determined by processing (e.g. by the radio access nodes and tracking function) the signals from the mobile device. The properties may include signal strength, propagation time, direction of arrival, or a combination thereof, for example. The tracking function may be integrated with the function or device 210, or it may be a separate function. The tracking involves determining the mobile device's location at a plurality of times, including the first set of times, and storing records indicating the mobile device's location and corresponding time. The location of the mobile device can thus be determined periodically by the network elements, for example at predetermined time intervals.

Following step 310, at step 320, the method 300 continues by determining, by the first function or device 210, a location of the mobile device at each of the first set of times. When the specified times are past times and the mobile device tracking is already being performed as described above, the determining proceeds by accessing the records stored in accordance with the tracking, as discussed above. Specifically, the records for the specified times are retrieved by the first function or device 210. If the specified times are future times and the mobile device tracking is already being performed, the determining may proceed by waiting until the future times have passed, and then obtaining the records for the specified times by the first function or device 210, either by retrieving them through a query or by pre-establishing a request to transmit the records to the first function or device 210 as soon as they are available. If the specified times are future times and the mobile device tracking is not yet being performed, the determining may proceed by initiating the mobile device tracking as discussed above and then obtaining the records for the specified times, as also discussed above.

At step 330, in response to receipt of the request by the first function, the method includes transmitting, to the mobile device, a reply including indications of the location of the mobile device at each of the first set of times. The indications of location included in the reply may be in the form of spatial coordinates (e.g. latitude and longitude (plus height) coordinates), along with corresponding ones of the times at which the mobile device was positioned at each respective location. The reply may be in the form of a "Location Information Response" message as already described above with respect to FIG. 2.

At step 340, in response to receipt of the reply by the mobile device, the method includes updating a local tracking operation performed by the mobile device to reflect the location of the mobile device at each of the first set of times as indicated in the reply. The updating may include restarting the local tracking operation from the last location indicated in the reply, or otherwise incorporating the location information indicated in the reply into the local tracking operation. The updating may include updating parameters of the local tracking operation based on the location information indicated in the reply. For example, the parameters of the local tracking operation may be updated to improve performance of the local tracking operation. Updating of the parameters does not necessarily required restarting of the tracking operation. Rather, the parameters can simply be modified and the tracking operation can continue with the new parameters. As noted elsewhere, the local tracking operation is based on locally available information (e.g. speed and direction information provided to the mobile device by local sensors of the device or a vehicle operatively coupled thereto).

In some embodiments, updating of the local tracking operation includes updating of a table held in memory of the mobile device. The table includes values of one or more parameters used in tracking operations to be performed by the mobile device. For example, one information item (or one row) in the table may indicate a relationship between a time and a received location and local parameters (such as speed). Accordingly, subsequent actions of the tracking operation may be performed based on this updated information. Similarly, other information items (or rows) in the table can be updated. In some cases, different information items can be updated based on contents of other information items in an update cascade. Substantially all relevant information for tracking (with the exception that location updates are still provided via the network) can be held locally by the mobile device. As such, once the mobile device receives a location information update, the mobile device can update the table by adding the corresponding locations (or information derived therefrom) to the proper field in the table. This update may be an update or addition of a relationship between locally held (at the mobile device) information and the received information. This may facilitate the tracking operations performed later.

At step 350, the method includes performing, by the mobile device, the local tracking operation to determine a location of the mobile device at a second time. The local tracking operation is based at least in part on the location of the mobile device at each of the first set of times and locally available information indicative of motion of the mobile device between at least one of the first set of times and the second time. The second time may be a current time of the mobile device. This step may be performed repeatedly for a plurality of second times, for example each second or multiple times per second. That is, the local tracking operation may be performed to determine the mobile device location at a time t4 (e.g. as in FIG. 1), as well as one or more subsequent times t5, t6, etc. (not illustrated). Each of t4, t5, t6, etc. may be referred to as a "second time" for purposes of disclosure. As such, the local tracking operation may be repeatedly performed at each of a plurality of times. Each tracking operation is based on the reference locations and the locally available information indicative of motion of the mobile device. Each of the plurality of times can be a time at which the location of the mobile device is needed, for example for navigation purposes. If the local tracking operation is restarted in step 340, the performing of the local tracking operation in step 350 may include performing the local tracking operation beginning from the restart point. The local tracking operation can continue indefinitely, or until a subsequent restart is performed for example in accordance with step 340.

As can be understood in view of the above, in order to assist with location estimation of a mobile device (e.g. in a vehicle), a first function or device is provided which manages substantially continuous tracking of the mobile device. The tracking can be performed at successive, relatively close times, for example. The tracking may be performed by default or in response to a request. Components or functions operating in a network may be configured to maintain a record of location information for each of a plurality of registered mobile devices. This record includes information, such as mobile device identifiers, the mobile device's location at one or more corresponding times, and indications of the corresponding times. The locations may be provided for example in the form of latitude, longitude and height data.

The tracking involves determining the mobile device's location at a plurality of times, and storing records indicating the mobile device's location and corresponding time.

Another embodiment of the present invention takes the form of a system. The system comprises a mobile device operatively coupled to a wireless network and configured to transmit a request for a location of the mobile device at a first set of times, and a first function or device operating in the wireless network. This system may closely map to the system 200 presented in FIG. 2, showing the mobile device 205 and the first function or device 210 being a function or device residing within or coupled to the a wireless network. Components of the system may be provided for example in accordance with the electronic device 500 of FIG. 5.

The first function or device 210 of the system is configured to determine a location of the mobile device 205 at each of the first set of times. The location may be determined based on information reported to the first function or device 210 from radio access nodes of the access network. The first function or device 210 is configured to subsequently receive the request from the mobile device 205, via the access network. The first function or device 210 is configured, in response to the request, to transmit, toward the mobile device and via the access network, a reply indicating the location of the mobile device 205 at each of the first set of times. The mobile device 205 is further configured, in response to receipt of the reply by the mobile device, to update parameters or starting conditions of a local tracking operation to reflect the location of the mobile device at each of the first set of times as indicated in the reply, and perform the local tracking operation to determine a location of the mobile device at a second time. The local tracking operation may be performed locally by the mobile device, based on locally generated information, and may be performed as a dead reckoning procedure. The local tracking operation may be based at least in part on the location of the mobile device at each of the first set of times and local input indicative of motion of the mobile device between at least one of the first set of times and the second time.

In yet another embodiment of the present invention, a mobile device 205 is provided which is operatively coupled to a wireless network. The mobile device 205 is configured to transmit a request for a location of the mobile device at a first set of times. The request may be transmitted via the wireless network to the first function or device 210. The mobile device is configured to receive a reply indicating the location of the mobile device at each of the first set of times. The reply may be transmitted toward mobile device from the first function operating in the wireless network. The mobile device is configured to update parameters or starting conditions of a local tracking operation to reflect the location of the mobile device at each of the first set of times as indicated in the reply. The updating may be performed in response to the reply. The mobile device is configured to perform the local tracking operation to determine a location of the mobile device at a second time. The mobile device may be configured to pre-register with the function or device 210 so that components coupled to the wireless network (e.g. the function or device 210, possibly along with an integrated or separate tracking function, radio access nodes, etc.) tracks the location of the mobile device at least at the first set of times, prior to receiving the request. The local tracking operation of the mobile device may be based at least in part on the location of the mobile device at each of the first set of times and local input indicative of motion of the mobile device between at least one of the first set of times and the second time. The procedure may be performed at a plurality of times, each of which may be a successive current time at which the location of the mobile device is required, for example for navigation purposes.

In a further embodiment of the present invention, a function operating in a wireless network is configured to determine a location of the mobile device at each of a first set of times, subsequently receive, from a mobile device operatively coupled to the wireless network, a request for a location of the mobile device at a first set of times, and in response to the request, transmit, toward the mobile device, a reply indicating the location of the mobile device at each of the first set of times.

Another embodiment of the present invention provides for messages for facilitating location determination at a mobile device. Yet another embodiment of the present invention provides for one or more devices configured to transmit or receive such messages, or a combination thereof.

As is apparent from the above discussion, various embodiments of the present invention may be applied to calculate or estimate the location of a vehicle using the assistance of an access network positioning function.

In some embodiments, a mobile device (e.g. a vehicle or device integrated with a vehicle) may register to a network positioning function (corresponding to the first function described above) in order to obtain location assistance from the network. The device may continuously record its driving mechanical parameters and maintain the driving mechanical record. Each entry in the driving mechanical record includes information such as the time (in microseconds, seconds or minutes), steer parameters at that time, speed parameters at that time, or similar information. One or more accelerometers can be used to provide this information, or one or more inputs can receive this information from other sources, such as vehicle sensors or a vehicle computer. Based on this information, a relatively accurate indication of displacement over time of the mobile device can be provided. Combined with an initial indication of location (as obtained from the network), this indication of displacement over time can be used to estimate the location of the mobile device at a specified future time. The driving mechanical record, or equivalent locally generated information indicative of motion (e.g. speed and direction) of the mobile device, is referred to as local input.

In some embodiments, when a device (e.g. vehicle) sends a "Location Information Request" message to the network function (i.e., a positioning function, also referred to as a first function), the device receives a "Location Information Response". The device is then configured to match each of reference locations in the "Location Information Response" with a mechanical record. The matching can be based on time information, i.e. as recorded in the mechanical records and as indicated in the location information response message. For each of the reference locations received from the access network, the device may: check the corresponding time associated with the reference location, and find the corresponding mechanical parameter record in its mechanical record, based on time index. Based on these reference locations and its mechanical records, the device is able to estimate its current location, as depicted in FIG. 2. The device thus repeats the above process until it is deregistered from the positioning function.

Figure 4:
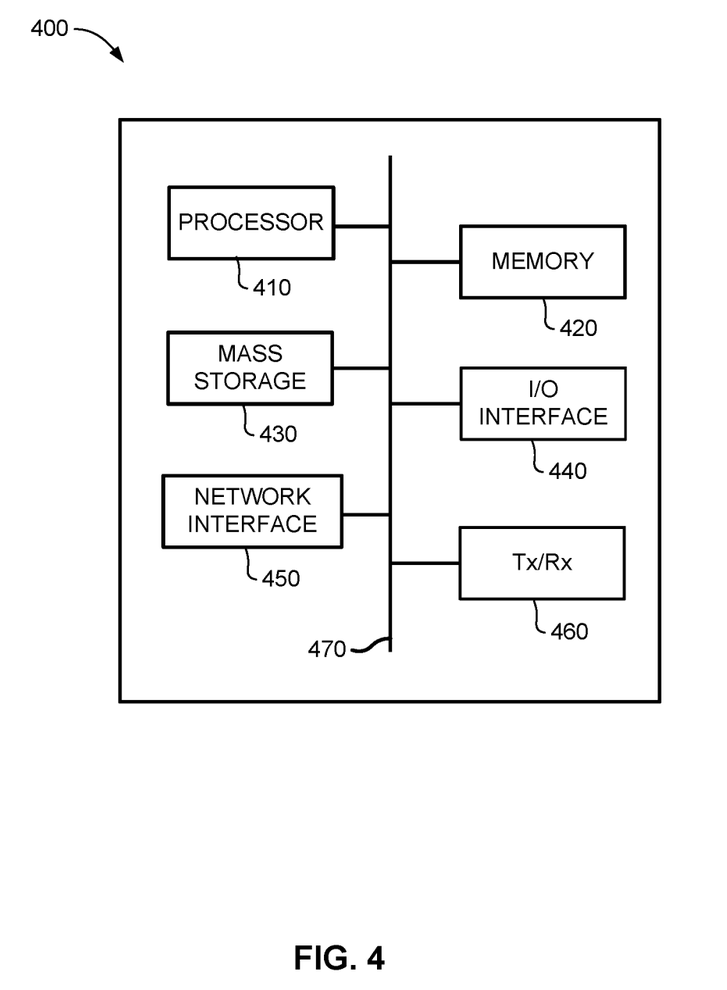
FIG. 4 illustrates, in a schematic diagram, an electronic device in accordance with embodiments of the present invention.

FIG. 4 is a schematic diagram of an electronic device 400 that may perform any or all of operations of the above methods and features explicitly or implicitly described herein, according to different embodiments of the present invention. For example, a computer equipped with network function may be configured as electronic device 400. The device may be a mobile device or a device hosting the first function in the network.

As shown, the device includes a processor 410, such as a Central Processing Unit (CPU) or specialized processors such as a Graphics Processing Unit (GPU) or other such processor unit, memory 420, non-transitory mass storage 430, I/O interface 440, network interface 450, and a transceiver 460, all of which are communicatively coupled via bi-directional bus 470. According to certain embodiments, any or all of the depicted elements may be utilized, or only a subset of the elements. Further, the device 400 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations. A communication interface as described herein may include a network interface 450, transceiver 460, or a combination thereof.

The memory 420 may include any type of non-transitory memory such as static random access memory (SRAM), dynamic random access memory (DRAM), synchronous DRAM (SDRAM), read-only memory (ROM), any combination of such, or the like. The mass storage element 430 may include any type of non-transitory storage device, such as a solid state drive, hard disk drive, a magnetic disk drive, an optical disk drive, USB drive, or any computer program product configured to store data and machine executable program code. According to certain embodiments, the memory 420 or mass storage 430 may have recorded thereon statements and instructions executable by the processor 410 for performing any of the aforementioned method operations described above.

Figure 5:
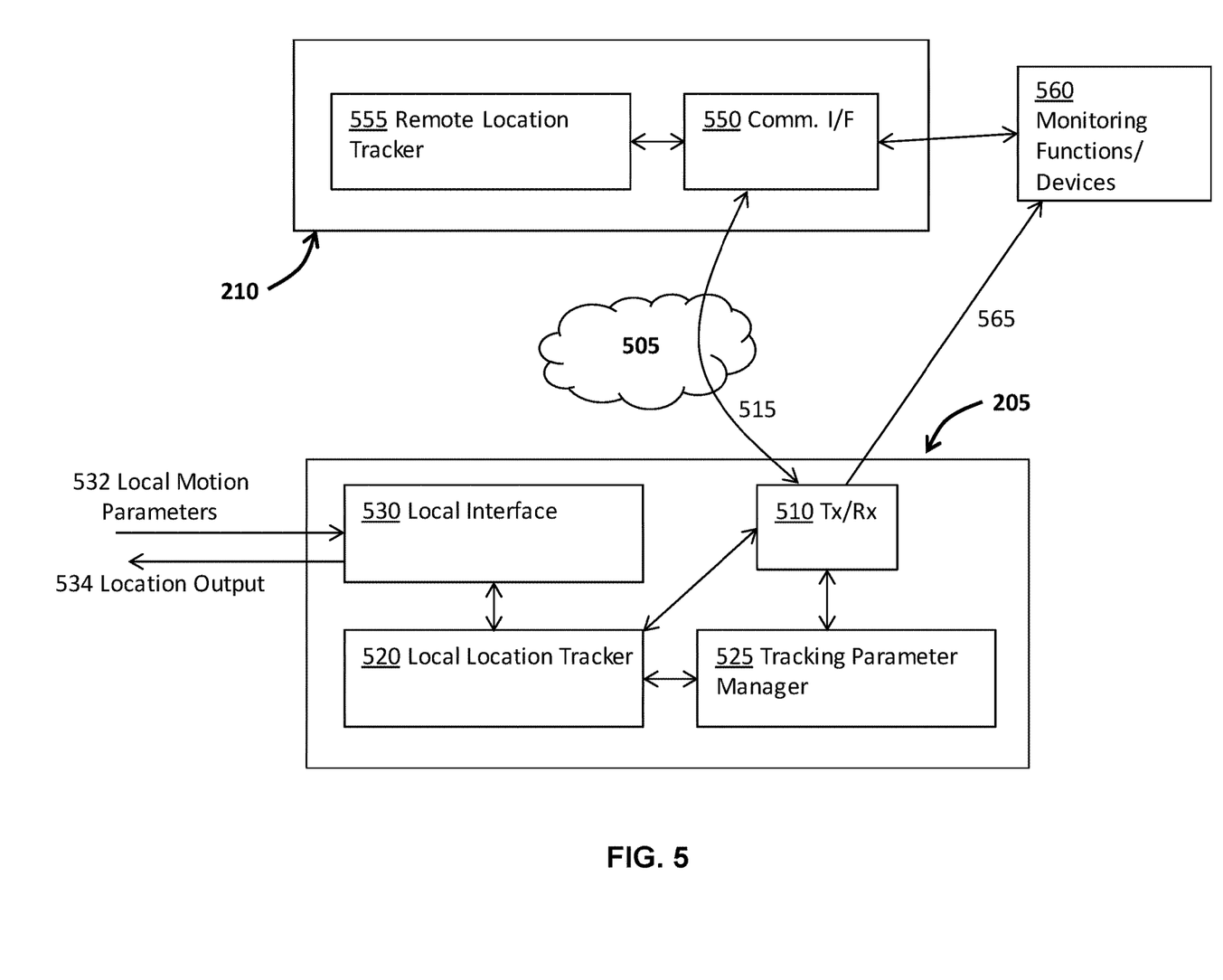
FIG. 5 illustrates a mobile device and corresponding network device in accordance with embodiments of the present invention.

FIG. 5 illustrates a mobile device 205 and corresponding network function or device 210 in accordance with embodiments of the present invention. The mobile device 205 and the network function or device 210 are communicatively coupled via communication link 515, which is mediated by a wireless access network 505. At least a portion of the link 515 is a wireless communication link. The mobile device 205 includes a wireless transmitter and receiver 510 which is used to communicate with the network function or device 210. The network function or device 210 has a corresponding communication interface 550 for communicating at least with the mobile device 205. The communication can include requests to begin tracking the mobile device, location information requests by the mobile device, and location information responses by the network function or device 210.

Signals 565 transmitted by the wireless transmitter and receiver 510 can also be captured by monitoring functions or devices 560. The monitoring functions or devices 560 may provide information indicative of mobile device location to the network function or device 210, thus assisting the network function or device 210 in tracking the location of the mobile device 205. The information from the monitoring functions or devices 560 can also be received by the communication interface 550. The monitoring functions or devices 560 may be located at wireless access nodes of the network 505, for example.

The network function or device 210 includes a remote location tracker 555 which tracks the location of the mobile device 205 based on information, for example received from the monitoring functions or devices 560. The remote location tracker 555 may determine the location of the mobile device 205 at each of a plurality of times and record this information for providing to the mobile device (via the communication interface 550) in a subsequent location information response message. The remote location tracker 555 may be used to track locations of multiple devices, and also to handle requests to begin or end tracking of mobile devices.

The mobile device 205 also includes a local location tracker 520, a tracking parameter manager 525, and a local interface 530. The local location tracker 520 can track the location of the mobile device based on information received from the network function or device 210 and local input 532. The information received from the network function or device includes indications of location of the mobile device at one or more specified times. The local input can include driving mechanical parameters, or other locally generated input indicative of speed or direction of the mobile device which can be used by the local location tracker 520 in a dead reckoning procedure. For example, the indications of location of the mobile device as received from the network function can be combined with the local input to determine the mobile device location at one or more specified times. The local interface 530 may also be used to provide location output such as indications of current location of the mobile device. This output may be provided to a navigation system for example.

The tracking parameter manager 525 can provide input to the local location tracker 520, such as parameters of a function or model used by the local location tracker to determine the mobile device location at the one or more specified times. The tracking parameter manager can also receive indications of location of the mobile device as received from the network function via the wireless transmitter and receiver 510. Based on the indications of location of the mobile device as received from the network function, and indications of location of the mobile device as received from the local location tracker, the tracking parameter manager can update the parameters that it holds and subsequently provides to the local location tracker. For example, the tracking parameter manager can determine a difference or error between the indications of location as received from the network function and the indications of the location as received from the local location tracker, and update tracking parameters (to be used in future dead reckoning procedures) to mitigate this difference or error in future.

In accordance with another embodiment of the present invention, there is presented a method. The method includes determining a location of a mobile device at each of a first set of times. The method further includes receiving, from the mobile device, a request for a location of the mobile device at a first set of times. The method further includes, in response to the request, transmitting, toward the mobile device, a reply indicating the location of the mobile device at each of the first set of times.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

As used herein, the term "about" should be read as including variation from the nominal value, for example, a +/−10% variation from the nominal value. It is to be understood that such a variation is always included in a given value provided herein, whether or not it is specifically referred to.

As used herein, the term "function" may refer to a device in a network, or an aspect of such a device. The device may be an electronic computing device for example having a computer processor, a memory, and a communication interface, or other equivalent electronics components. A function may be a dedicated electronic device or a virtualized device which is instantiated using electronic components of a server, datacenter, etc. A function is configured to perform predetermined computer processing operations for example including receiving, processing and transmitting data via a communication interface. FIG. 5 illustrates an example of a network function.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method comprising:
   transmitting a request by a mobile device toward a first function which is remote from the mobile device and which operates in a network, the request being for locations of the mobile device at each of a first set of times, the request transmitted based on a determination, by the mobile device, that a local tracking operation requires the locations of the mobile device at each of the first set of times as determined by one or more devices in the network, in order to determine, within predetermined error bounds, a location of the mobile device at a second time;
   receiving, by the mobile device, a reply indicating the locations of the mobile device at each of the first set of times as determined by the one or more devices in the network; and
   performing, by the mobile device, the local tracking operation to determine the location of the mobile device at the second time, the local tracking operation based at least in part on the location of the mobile device at each of the first set of times, as indicated in the reply, and local input indicative of motion of the mobile device between at least one of the first set of times and the second time.

2. The method of claim 1, wherein the location of the mobile device at the each of the first set of times is determined, by the first function or another function remote from the mobile device, based on measuring and processing of radio signals transmitted by the mobile device at the at least one of the first set of times.

3. The method of claim 1, wherein the request is transmitted by the mobile device based on one or more of: a predetermined time schedule; a determination that the mobile device has travelled at least a predetermined distance from the locations of the mobile device at each of the first set of times; and a determination that an estimate of location previously locally generated by the mobile device includes a predetermined threshold amount of error.

4. The method of claim 1, wherein the local tracking operation comprises:

recording mechanical parameters of a vehicle incorporating the mobile device at times following the first set of times, the mechanical parameters indicative of speed and direction of the vehicle between the first set of times and the second time; and estimating, based on the recorded mechanical parameters together with the location of the mobile device at each of the first set of times as indicated in the reply, the location of the mobile device at the second time.

5. The method of claim 1, wherein the first set of times includes a single time or multiple times.

6. The method of claim 1, further comprising, prior to transmitting the request for the location of the mobile device: transmitting a tracking request toward the first function, the tracking request causing the first function to track the location of the mobile device at a plurality of times including the first set of times.

7. The method of claim 1, wherein the local tracking operation is performed at the second time.

8. The method of claim 1, further comprising: repeatedly performing, by the mobile device, the local tracking operation at each of a plurality of second times, including the second time, to determine the location of the mobile device at each of said plurality of second times, the local tracking operation based at least in part on the location of the mobile device at each of the first set of times and local input indicative of motion of the mobile device between at least one of the first set of times and a respective one of the plurality of second times.

9. The method of claim 1, wherein the local tracking operation comprises updating a previous iteration of the local tracking operation to increase accuracy of determination of the location of the mobile device at the second time.

10. A mobile device configured to:
transmit a request toward a first function which is remote from the mobile device and which operates in a network, the request being for locations of the mobile device at each of a first set of times, the request transmitted based on a determination, by the mobile device, that a local tracking operation requires the locations of the mobile device at each of the first set of times as determined by one or more devices in the network, in order to determine, within predetermined error bounds, a location of the mobile device at a second time;
receive, from the first function, a reply indicating the locations of the mobile device at each of the first set of times as determined by the one or more devices in the network; and
perform the local tracking operation to determine the location of the mobile device at the second time, the local tracking operation based at least in part on the location of the mobile device at each of the first set of times, as indicated in the reply, and local input indicative of motion of the mobile device between at least one of the first set of times and the second time.

11. The mobile device of claim 10, wherein the location of the mobile device at the each of the first set of times is determined, by the first function or another function remote from the mobile device, based on measuring and processing of radio signals transmitted by the mobile device at the at least one of the first set of times.

12. The mobile device of claim 10, wherein mobile device is configured to transmit the request based on one or more of: a predetermined time schedule; a determination that the mobile device has travelled at least a predetermined distance from the locations of the mobile device at each of the first set of times; and a determination that an estimate of location previously locally generated by the mobile device includes a predetermined threshold amount of error.

13. The mobile device of claim 10, wherein the local tracking operation comprises:
recording mechanical parameters of a vehicle incorporating the mobile device at times following the first set of times, the mechanical parameters indicative of speed and direction of the vehicle between the first set of times and the second time; and
estimating, based on the recorded mechanical parameters together with the location of the mobile device at each of the first set of times as indicated in the reply, the location of the mobile device at the second time.

14. The mobile device of claim 10, further configured, prior to transmitting the request for the location of the mobile device, to transmit a tracking request toward the first function, the tracking request causing the first function to track the location of the mobile device at a plurality of times including the first set of times.

15. The mobile device of claim 10, further configured to: repeatedly perform the local tracking operation at each of a plurality of second times, including the second time, to determine the location of the mobile device at each of said plurality of second times, the local tracking operation based at least in part on the location of the mobile device at each of the first set of times and local input indicative of motion of the mobile device between at least one of the first set of times and a respective one of the plurality of second times.

* * * * *